(12) United States Patent
Okura et al.

(10) Patent No.: US 6,487,722 B1
(45) Date of Patent: Nov. 26, 2002

(54) EPG TRANSMITTING APPARATUS AND METHOD, EPG RECEIVING APPARATUS AND METHOD, EPG TRANSMITTING/RECEIVING SYSTEM AND METHOD, AND PROVIDER

(75) Inventors: Yukiko Okura, Tokyo (JP); Takashi Tsurumoto, Saitama (JP); Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/245,871

(22) Filed: Feb. 8, 1999

(30) Foreign Application Priority Data

Feb. 12, 1998 (JP) .................................... 10-029682

(51) Int. Cl.⁷ .......................... G06F 3/00; H04N 7/173
(52) U.S. Cl. ............................. 725/40; 725/101; 725/39
(58) Field of Search ........................ 725/1–8, 37, 40, 725/55, 43, 52, 51, 101, 102, 103, 23, 39, 41

(56) References Cited

U.S. PATENT DOCUMENTS

| | | | | | |
|---|---|---|---|---|---|
| 5,801,747 | A | * | 9/1998 | Bedard | 348/1 |
| 5,801,785 | A | * | 9/1998 | Crump et al. | 348/563 |
| 5,812,123 | A | * | 9/1998 | Rowe et al. | 345/327 |
| 5,850,218 | A | * | 12/1998 | Lajoie et al. | 345/327 |
| 6,222,530 | B1 | * | 4/2001 | Sequeira | 345/327 |
| 6,347,400 | B1 | * | 2/2002 | Ohkura et al. | 725/60 |

* cited by examiner

*Primary Examiner*—John Miller
*Assistant Examiner*—Annan Shang
(74) *Attorney, Agent, or Firm*—Jay H. Maioli

(57) ABSTRACT

The broadcast hour and the title of a program is displayed in an EPG (Electronic Program Guide). If the charge of the program is lower than the other corresponding programs, a symbol "Discount" is also displayed. If the program is the last one of NVOD (Near Video On Demand) programs, a symbol "Last" is also displayed.

19 Claims, 11 Drawing Sheets

| CH | 8:00 | 9:00 | 10:00 | |
|---|---|---|---|---|
| 107 Asahi | PROGRAM TITLE A | *Live* | PROGRAM TITLE A | |
| 108 Asahi | | PROGRAM TITLE A | | PROGRAM TITLE A |
| 109 Asahi | | PROGRAM TITLE A | | |
| 110 Asahi | | | PROGRAM TITLE A | |
| 111 Japan | PROGRAM TITLE B | | | |
| 112 Japan | | PROGRAM TITLE B | | |
| 113 Japan | | PROGRAM TITLE B | Discount! | |
| 114 Japan | | | PROGRAM TITLE B | Last! |
| 115 STV | PROGRAM TITLE C | PROGRAM TITLE C | PROGRAM Discount! | PROGRAM T Discount! |

CHANNEL / FRAME / BROADCAST HOUR

FIG. 5

| KIND OF ATTRIBUTE | ATTRIBUTE DATA | EXPLANATION |
|---|---|---|
| PROGRAM CONTENT ATTRIBUTE | | DESIGNATION OF PROGRAM CONTENT ATTRIBUTE |
| | EXCEPTIONAL PROGRAM | EXCEPTIONAL PROGRAM |
| | EXCLUDED | EXCLUDED PROGRAM |
| | LIVE | LIVE BROADCAST |
| | NO-CUT | INDICATES THAT A MOVIE OR THE LIKE WILL BE BROADCAST WITHOUT CUTTING ANY PORTIONS. |
| | SPECIAL | SPECIAL PROGRAM |
| | SPECIAL FEATURE | SPECIAL FEATURE PROGRAM |
| | URGENT | URGENT PROGRAM |
| | FLASH | NEWS FLASH |
| | RECOMMENDABLE | RECOMMENDABLE PROGRAM OF STATION WITH RECOMMENDATION GRADE SIGN (*, **, ***) |
| | SERIES | SERIES PROGRAM |
| PROGRAM OPERATION ATTRIBUTE | | DESIGNATION OF PROGRAM OPERATION |
| | NEW PROGRAM | ATTRIBUTE MAINLY INDICATES FIRST BROADCAST OF SERIES PROGRAMS. |
| | REBROADCAST | REBROADCAST |
| | FINAL PROGRAM | FINAL ONE OF SERIES PROGRAMS |
| | LAST | INDICATES LAST BROADCAST OF NVOD. |
| | DISCOUNT | INDICATES THAT A SCHEDULED PPV BROADCAST IS LESS EXPENSIVE THAN USUAL. |
| PROGRAM MODE ATTRIBUTE | | DESIGNATION OF PROGRAM MODE ATTRIBUTE |
| | HD BROADCAST | HIGH-DEFINITION MODE BROADCAST |
| | MULTI-ANGLE | MULTI-ANGLE BROADCAST |
| | DIGITAL SURROUND | DIGITAL SURROUND BROADCAST |
| | INTERACTIVE | TWO-WAY SERVICE BROADCAST |
| | DATA BROADCAST | INDICATES THAT THE PROGRAM IS A DATA BROADCAST PROGRAM. |
| | AUDIO BROADCAST | INDICATES THAT THE PROGRAM WILL BE BROADCAST ONLY BY AUDIO. |
| | MONOCHROME | MONOCHROME BROADCAST |
| | STEREO | STEREO BROADCAST |
| | CAPTION | INDICATES THAT THE PROGRAM IS ASSOCIATED WITH CAPTIONS. |
| | WIDE | WIDE BROADCAST |
| | BILINGUAL | BILINGUAL BROADCAST |
| | MULTI-LINGUAL | MULTI-LINGUAL BROADCAST |
| | DUAL AUDIO | DUAL AUDIO BROADCAST |
| | SIGN LANGUAGE | BROADCAST WITH SIGN LANGUAGE |
| | NON-SCRAMBLED | NON-SCRAMBLED BROADCAST |
| | SCRAMBLED | SCRAMBLED BROADCAST |
| TEXT ATTRIBUTE | | DESIGNATION OF TEXT ATTRIBUTE OF EPG |
| | | PROGRAM TITLE |
| | TEXT COLOR | COLOR DESIGNATION OF TITLE TEXT |
| | UNDERLINE | UNDERLINE DESIGNATION OF TITLE TEXT |
| | ITALIC | ITALIC DESIGNATION OF TITLE TEXT |
| | BLINK | BLINK DESIGNATION OF TITLE TEXT |
| | BACKGROUND COLOR | BACKGROUND COLOR DESIGNATION OF TITLE TEXT |
| | BOLD | BOLD DESIGNATION OF TITLE TEXT |

FIG. 6

| CHANNEL | 8:00 | 9:00 | 10:00 | |
|---|---|---|---|---|
| CH | | | | BROADCAST HOUR |
| 107 Asahi | PROGRAM TITLE A | Live | PROGRAM TITLE A | |
| 108 Asahi | | PROGRAM TITLE A | | PROGRAM TITLE A |
| 109 Asahi | | | PROGRAM TITLE A | |
| 110 Asahi | | | PROGRAM TITLE A | |
| 111 Japan | PROGRAM TITLE B | | | |
| 112 Japan | | PROGRAM TITLE B | | |
| 113 Japan | | PROGRAM TITLE B | | |
| 114 Japan | | | PROGRAM TITLE B | Discount! Last! |
| 115 STV | PROGRAM TITLE C | PROGRAM TITLE C | PROGRAM TITLE B | Discount! PROGRAM T Discount! |

FRAME

FIG. 9

| CHANNEL | FRAME | | BROADCAST HOUR | |
|---|---|---|---|---|
| CH | 8:00 | 9:00 | 10:00 | |
| 107 Asahi | *PROGRAM TITLE A* | | PROGRAM TITLE A | |
| 108 Asahi | | PROGRAM TITLE A | | PROGRAM TITLE A |
| 109 Asahi | | | PROGRAM TITLE A | |
| 110 Asahi | | | PROGRAM TITLE A | |
| 111 Japan | PROGRAM TITLE B | | | |
| 112 Japan | | PROGRAM TITLE B | | |
| 113 Japan | | PROGRAM TITLE B | | |
| 114 Japan | | *PROGRAM TITLE B* | | |
| 115 STV | PROGRAM TITLE C | PROGRAM TITLE C | PROGRAM TITLE C | PROGRAM TITLE C |

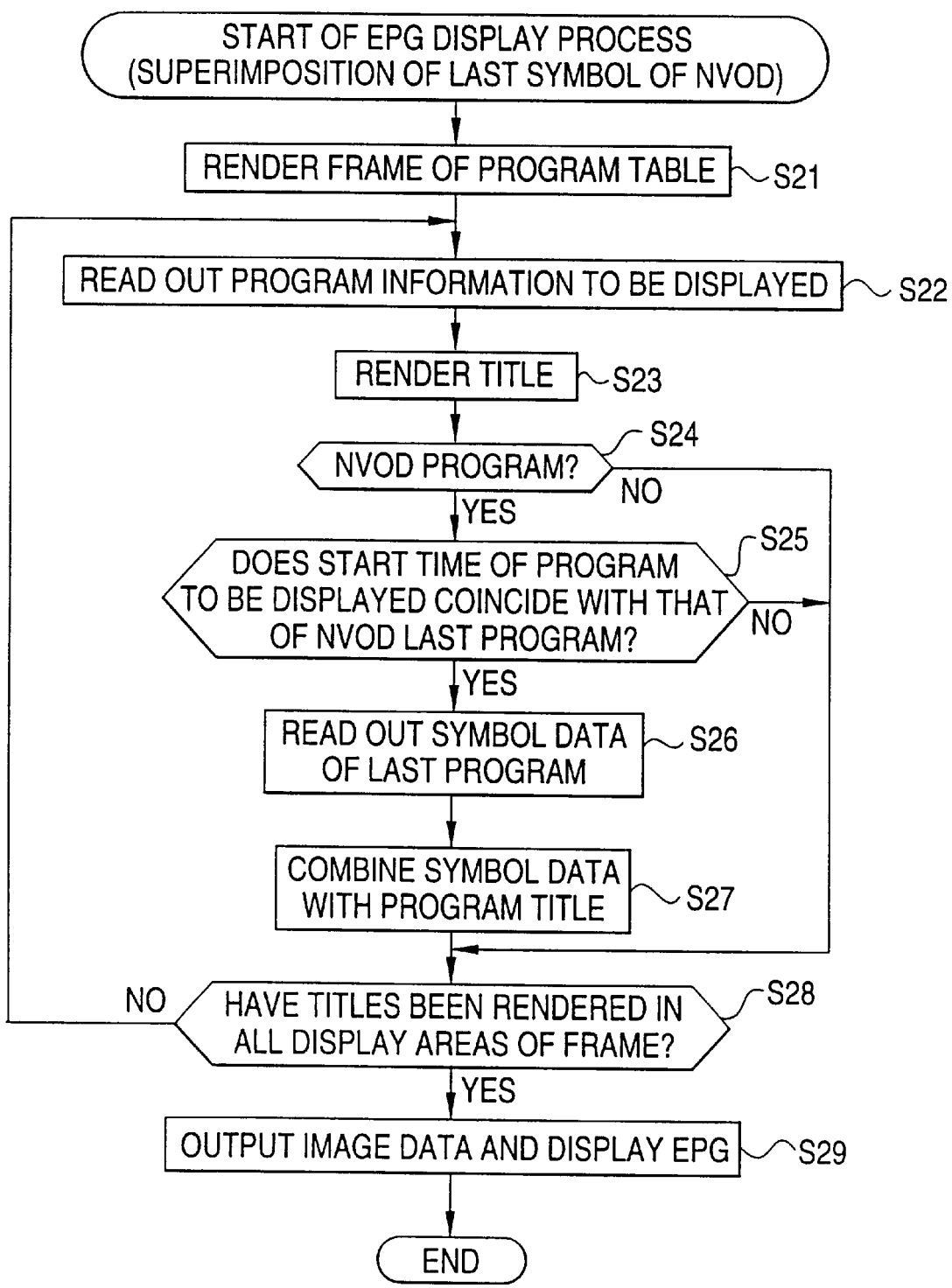

EPG TRANSMITTING APPARATUS AND
METHOD, EPG RECEIVING APPARATUS
AND METHOD, EPG TRANSMITTING/
RECEIVING SYSTEM AND METHOD, AND
PROVIDER

BACKGROUND OF THE INVENTION

1. Field of the Invention

The present invention relates to an EPG (Electronic Program Guide) transmitting apparatus and method, an EPG receiving apparatus and method, an EPG transmitting/receiving system and method, and a provider. In particular, the invention relates to an EPG transmitting apparatus and method, an EPG receiving apparatus and method, an EPG transmitting/receiving system and method, and a provider which allow viewers to recognize the feature of a NVOD (Near Video On Demand) program easily and reliably and hence can have that program viewed by more viewers.

2. Description of the Related Art

In recent years, also in Japan, digital satellite broadcasting has started and it has become possible to provide programs on as many as 100 channels or more. By virtue of the increase in the number of channels, what is called NVOD (near video on demand) has also been realized in which, for example, the same program is broadcast six times with 10 minutes' delays in broadcast hours. This enables viewers to watch a desired program from its start in which they can select a watching start time in a one-hour period.

As the number of channels increases as mentioned above, it becomes more inconvenient for a viewer to select a desired program properly from a number of programs. In view of this, EPG (electronic program guide) data is transmitted separately from information of primary programs so that viewers can select a desired program based on the EPG.

To enable selection of a desired program from many programs, it has been proposed to use EPG data so as to display, for example, a mark that indicates the category of each program. Looking at a category mark, viewers can recognize relatively easily what category (e.g., movies, sports, or news) the program belongs to.

However, the conventional digital satellite broadcast has a problem that it is impossible to provide viewers quickly and reliably with information that characterizes each program, though as described above information allowing discrimination between programs on a group-by-group basis is now transmitted.

For example, the NVOD has a problem that even if the same program is broadcast six times, viewers cannot judge quickly and reliably which is the last version, in other words, the start time of a version of the program that viewers are required to watch at the latest if they wish to see the program.

SUMMARY OF THE INVENTION

The present invention has been made in view of the above circumstances in the art, and an object of the invention is therefore to enable viewers to intuitively recognize information that characterizes each program in a quick and reliable manner and to provide viewers with the feature of each program, to thereby promote viewing of programs.

An EPG transmitting apparatus according to a first aspect of the invention comprises generating means for generating an EPG that represents a transmission schedule of programs to be transmitted; adding means for generating additional information to be used to display, so that the additional information is superimposed on the EPG, feature recognition information for allowing a viewer to intuitively recognize a feature of a particular one of the programs that differentiates the particular program from other ones of the programs, and for adding the feature recognition information to the EPG; and transmitting means for transmitting the EPG to which the additional information has been added.

An EPG transmitting method according to the first aspect of the invention comprises a generating step of generating an EPG that represents a transmission schedule of programs to be transmitted; an adding step of generating additional information to be used to display, so that the additional information is superimposed on the EPG, feature recognition information for allowing a viewer to intuitively recognize a feature of a particular one of the programs that differentiates the particular program from other ones of the programs, and for adding the feature recognition information to the EPG; and a transmitting step of transmitting the EPG to which the additional information has been added.

A provider according to the first aspect of the invention provides a computer program comprising a generating step of generating an EPG that represents a transmission schedule of programs to be transmitted; an adding step of generating additional information to be used to display, so that the additional information is superimposed on the EPG, feature recognition information for allowing a viewer to intuitively recognize a feature of a particular one of the programs that differentiates the particular program from other ones of the programs, and for adding the feature recognition information to the EPG; and a transmitting step of transmitting the EPG to which the additional information has been added.

An EPG receiving apparatus according to a second aspect of the invention comprises receiving means for receiving an EPG to which additional information to be used to display, so that the additional information is superimposed on the EPG, feature recognition information for allowing a viewer to intuitively recognize a feature of a particular one of programs that differentiates the particular program from other ones of the programs is added; extracting means for extracting the additional information from the EPG that has been received by the receiving means; storing means for storing information to be used for displaying the feature recognition information; and display control means for reading out the information stored in the storing means and corresponding to the additional information that has been extracted by the extracting means, and displaying the feature recognition information.

An EPG receiving method according to the second aspect of the invention comprises a receiving step of receiving an EPG to which additional information to be used to display, so that the additional information is superimposed on the EPG, feature recognition information for allowing a viewer to intuitively recognize a feature of a particular one of programs that differentiates the particular program from other ones of the programs is added; an extracting step of extracting the additional information from the EPG that has been received by the receiving step; a storing step of storing information to be used for displaying the feature recognition information; and a display control step of reading out the information stored by the storing step and corresponding to the additional information that has been extracted by the extracting step, and displaying the feature recognition information.

A provider according to the second aspect of the invention provides a computer program comprising a receiving step of receiving an EPG to which additional information to be used to display, so that the additional information is superimposed on the EPG, feature recognition information for allowing a viewer to intuitively recognize a feature of a particular one of programs that differentiates the particular program from other ones of the programs is added; an extracting step of extracting the additional information from the EPG that has been received by the receiving step; a storing step of storing information to be used for displaying the feature recognition information; and a display control step of reading out the information stored by the storing step and corresponding to the additional information that has been extracted by the extracting step, and displaying the feature recognition information.

An EPG transmitting and receiving system according to a third aspect of the invention comprises an EPG transmitting apparatus for transmitting information, comprising generating means for generating an EPG that represents a transmission schedule of programs to be transmitted; adding means for generating additional information to be used to display, so that the additional information is superimposed on the EPG, feature recognition information for allowing a viewer to intuitively recognize a feature of a particular one of the programs that differentiates the particular program from other ones of the programs, and for adding the feature recognition information to the EPG; and transmitting means for transmitting the EPG to which the additional information has been added; and an EPG receiving apparatus for receiving the information transmitted from the EPG transmitting apparatus, comprising receiving means for receiving the EPG transmitted from the transmitting apparatus; extracting means for extracting the additional information from the EPG received by the receiving means; storing means for storing information to be used for displaying the feature recognition information; and display control means for reading out the information stored in the storing means and corresponding to the additional information that has been extracted by the extracting means, and displaying the feature recognition information.

An EPG transmitting and receiving method according to the third aspect of the invention in an EPG transmitting and receiving apparatus including an EPG transmitting apparatus for transmitting information and an EPG receiving apparatus for receiving the information transmitted from the EPG transmitting apparatus, comprises, in the EPG transmitting apparatus, a generating step of generating an EPG that represents a transmission schedule of programs to be transmitted; an adding step of generating additional information to be used to display, so that the additional information is superimposed on the EPG, feature recognition information for allowing a viewer to intuitively recognize a feature of a particular one of the programs that differentiates the particular program from other ones of the programs, and for adding the feature recognition information to the EPG; and a transmitting step of transmitting the EPG to which the additional information has been added, and the method further comprises, in the EPG receiving apparatus, a receiving step of receiving the EPG transmitted by the transmitting step; an extracting step of extracting the additional information from the EPG received by the receiving step; a storing step of storing information to be used for displaying the feature recognition information; and a display control step of reading out the information stored by the storing step and corresponding to the additional information that has been extracted by the extracting step, and displaying the feature recognition information.

A provider according to the third aspect of the invention provides a computer program to be used in an EPG transmitting and receiving apparatus including an EPG transmitting apparatus for transmitting information and an EPG receiving apparatus for receiving the information transmitted from the EPG transmitting apparatus, a part of the computer program for the EPG transmitting apparatus comprising a generating step of generating an EPG that represents a transmission schedule of programs to be transmitted; an adding step of generating additional information to be used to display, so that the additional information is superimposed on the EPG, feature recognition information for allowing a viewer to intuitively recognize a feature of a particular one of the programs that differentiates the particular program from other ones of the programs, and for adding the feature recognition information to the EPG; and a transmitting step of transmitting the EPG to which the additional information has been added, a part of the computer program for the EPG receiving apparatus comprising a receiving step of receiving the EPG transmitted by the transmitting step; an extracting step of extracting the additional information from the EPG received by the receiving step; a storing step of storing information to be used for displaying the feature recognition information; and a display control step of reading out the information stored by the storing step and corresponding to the additional information that has been extracted by the extracting step, and displaying the feature recognition information.

An EPG receiving apparatus according to a fourth aspect of the invention comprises receiving means for receiving an EPG that represents a schedule of programs to be transmitted; detecting means for detecting whether a particular one of the programs has a feature that differentiates the particular program from other ones of the programs; and display control means for displaying, in accordance with a recognition result of the detecting means, feature recognition information for allowing a viewer to intuitively recognize that the particular program has the feature that differentiates the particular program from the other ones of the programs so that the feature recognition information is superimposed on the EPG.

An EPG receiving method according to the fourth aspect of the invention comprises a receiving step of receiving an EPG that represents a schedule of programs to be transmitted; a detecting step of detecting whether a particular one of the programs has a feature that differentiates the particular program from other ones of the programs; and a display control step of displaying, in accordance with a recognition result of the detecting step, feature recognition information for allowing a viewer to intuitively recognize that the particular program has the feature that differentiates the particular program from the other ones of the programs so that the feature recognition information is superimposed on the EPG.

A provider according to the fourth aspect of the invention provides a computer program comprising a receiving step of receiving an EPG that represents a schedule of programs to be transmitted; a detecting step of detecting whether a particular one of the programs has a feature that differentiates the particular program from other ones of the programs; and a display control step of displaying, in accordance with a recognition result of the detecting step, feature recognition information for allowing a viewer to intuitively recognize that the particular program has the feature that differentiates the particular program from the other ones of the programs so that the feature recognition information is superimposed on the EPG.

In the EPG transmitting apparatus, the EPG transmitting method, and the provider according to the first aspect of the invention, additional information to be used for displaying feature recognition information so that it is superimposed on an EPG is transmitted.

In the EPG receiving apparatus, the EPG receiving method, and the provider according to the second aspect of the invention, feature recognition information corresponding to received additional information is displayed.

In the EPG transmitting and receiving system, the EPG transmitting and receiving method, and the provider according to the third aspect of the invention, additional information is transmitted from an EPG transmitting apparatus and feature recognition information corresponding to the received additional information is displayed in the EPG receiving apparatus.

In the EPG receiving apparatus, the EPG receiving method, and the provider according to the fourth aspect of the invention, whether a particular program has a feature that differentiates it from other programs is detected and feature recognition information is displayed so as to be superimposed on an EPG in accordance with a detection result.

BRIEF DESCRIPTION OF THE DRAWINGS

FIG. 5 shows contents to be transmitted as program flags;

FIG. 6 is an illustration showing a display example on the monitor shown in FIG. 2;

FIG. 9 is an illustration showing a further display example on the monitor shown in FIG. 2;

FIG. 11 is a flowchart showing another EPG display process.

DETAILED DESCRIPTION OF THE PREFERRED EMBODIMENTS

Embodiments of the present invention will be described below. Before doing so, to clarify a corresponding relationship between each means of the invention described in the claims and components of the following embodiments, the features of the invention will be described below in such a manner that each means is followed, in parentheses, by a corresponding component (just an example) of the embodiments. However, naturally, the following statement does not mean that each means is limited to the component following it.

Figure 1:
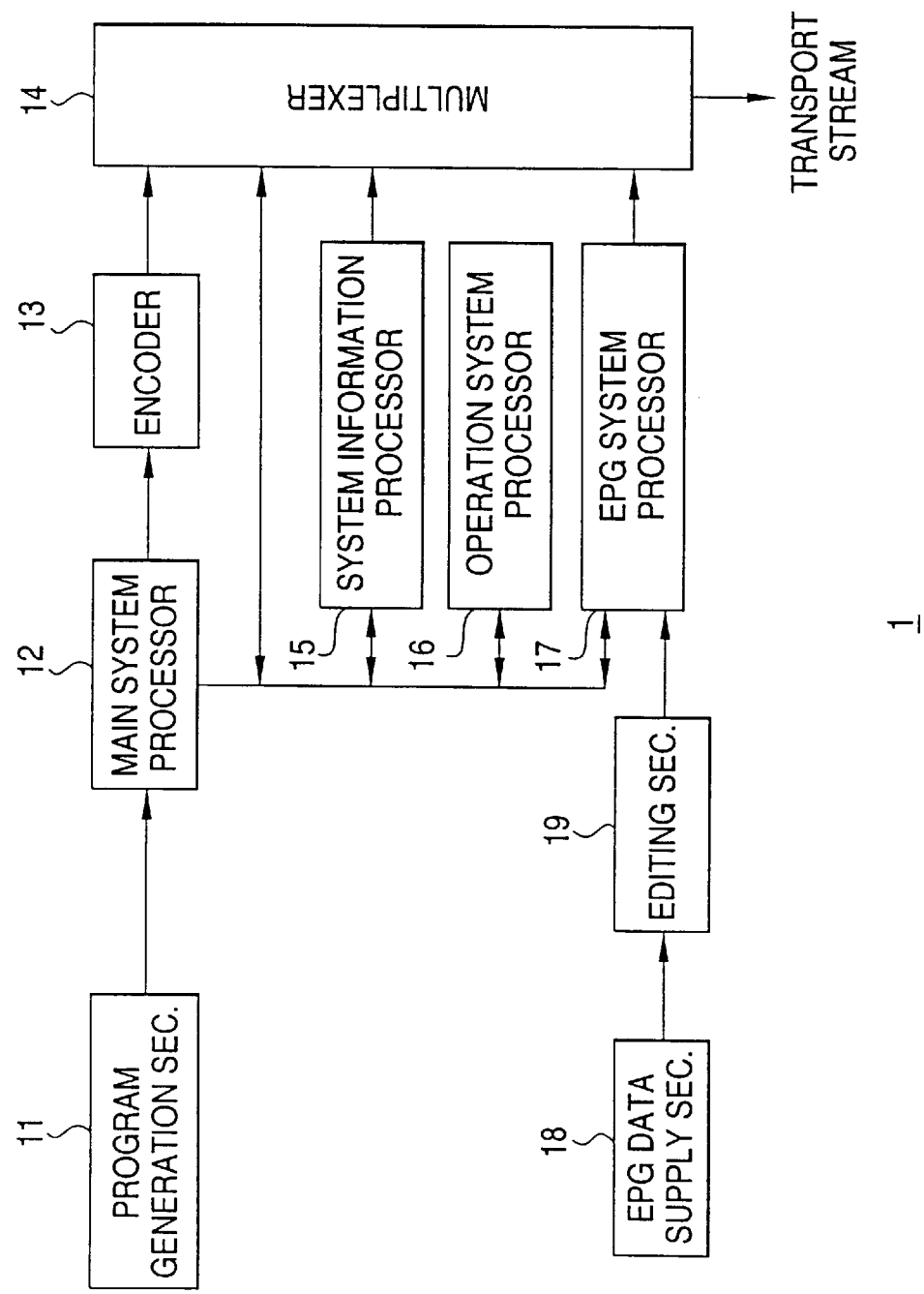
FIG. 1 is a block diagram showing an example configuration of a transmitting apparatus according to the present invention.

The EPG transmitting apparatus according to the first aspect of the invention comprises generating means (e.g., an EPG data supply section 18 shown in FIG. 1) for generating an EPG that represents a transmission schedule of programs to be transmitted; adding means (e.g., an editing section 19 shown in FIG. 1) for generating additional information (e.g., a program flag generated by the editing section 19 shown in FIG. 1) to be used to display, so that the additional information is superimposed on the EPG, feature recognition information (e.g., a symbol "Last" shown in FIG. 6) for allowing a viewer to intuitively recognize a feature of a particular one of the programs that differentiates the particular program from other ones of the programs, and for adding the feature recognition information to the EPG; and transmitting means (e.g., a multiplexer 14 shown in FIG. 1) for transmitting the EPG to which the additional information has been added.

The EPG receiving apparatus according to the second aspect of the invention comprises receiving means (e.g., a tuner 41 shown in FIG. 2) for receiving an EPG to which additional information to be used to display, so that the additional information is superimposed on the EPG, feature recognition information for allowing a viewer to intuitively recognize a feature of a particular one of programs that differentiates the particular program from other ones of the programs is added; extracting means (e.g., a control CPU 44 shown in FIG. 2) for extracting the additional information from the EPG that has been received by the receiving means; storing means (e.g., a program flag symbol memory 50 shown in FIG. 2) for storing information to be used for displaying the feature recognition information; and display control means (e.g., an OSD control section 49 shown in FIG. 2) for reading out the information stored in the storing means and corresponding to the additional information that has been extracted by the extracting means, and displaying the feature recognition information.

The EPG transmitting and receiving system according to the third aspect of the invention comprises an EPG transmitting apparatus for transmitting information, comprising generating means (e.g., the EPG data supply section 18 shown in FIG. 1) for generating an EPG that represents a transmission schedule of programs to be transmitted; adding means (e.g., the editing section 19 shown in FIG. 1) for generating additional information to be used to display, so that the additional information is superimposed on the EPG, feature recognition information for allowing a viewer to intuitively recognize a feature of a particular one of the programs that differentiates the particular program from other ones of the programs, and for adding the feature recognition information to the EPG; and transmitting means (e.g., the multiplexer 14 shown in FIG. 1) for transmitting the EPG to which the additional information has been added; and an EPG receiving apparatus for receiving the information transmitted from the EPG transmitting apparatus, comprising receiving means (e.g., the tuner 41 shown in FIG. 2) for receiving the EPG transmitted from the transmitting apparatus; extracting means (e.g., the control CPU 44 shown in FIG. 2) for extracting the additional information from the EPG received by the receiving means; storing means (e.g., the program flag symbol memory 50 shown in FIG. 2) for storing information to be used for displaying the feature recognition information; and display control means (e.g., the OSD control section 49 shown in FIG. 2) for reading out the information stored in the storing means and corresponding to the additional information that has been extracted by the extracting means, and displaying the feature recognition information.

The EPG receiving apparatus according to the fourth aspect of the invention comprises receiving means (e.g., the tuner 41 shown in FIG. 2) for receiving an EPG that represents a schedule of programs to be transmitted; detecting means (e.g., the control CPU 44 shown in FIG. 2) for detecting whether a particular one of the programs has a feature that differentiates the particular program from other ones of the programs; and display control means (e.g., the OSD control section 49 shown in FIG. 2) for displaying, in accordance with a recognition result of the detecting means, feature recognition information for allowing a viewer to intuitively recognize that the particular program has the feature that differentiates the particular program from the other ones of the programs so that the feature recognition information is superimposed on the EPG.

The EPG receiving apparatus according to the fourth aspect of the invention may further comprise storing means (e.g., the program flag symbol memory 50 shown in FIG. 2) for storing the feature recognition information.

FIG. 1 shows an example configuration of a transmitting apparatus 1 that constitutes a transmitting/receiving system according to the invention. In the transmitting apparatus 1, a program generation section 11 generates data (audio data and video data) of a program to be broadcast. A main system processor 12 supplies an encoder 13 with program data that is supplied from the program generation section 11 and makes the encoder 13 encode the program data. Further, the main system processor 12 generates a reference clock signal, time information, etc. and supplies those to a system information processor 15, an operation system processor 16, an EPG system processor 17, a multiplexer 14, etc. The encoder 13 encodes the program data that is supplied from the program generation section 11 via the main system processor 12 according to, for example, the MPEG scheme and outputs encoded data to the multiplexer 14.

The system information processor 15 generates system information and controls a multiplexing process of the multiplexer 14. The operation system processor 16 processes an instruction corresponding to an input from a keyboard, a mouse (both not shown), or the like and outputs a processing result to the main system processor 12 when necessary.

An EPG data supply section 18 generates EPG data and outputs it to an editing section 19. Where an individual program has a feature and it is desired to display an EPG of the program with feature recognition information added to it, the editing section 19 generates a program flag indicating that situation and inserts it in the EPG data. The EPG system processor 17 processes the EPG data that is supplied from the editing section 19, in synchronism with a signal that is supplied from the main system processor 12, and outputs processed data to the multiplexer 14. The multiplexer 14 combines the program data (audio data and video data) that is supplied from the encoder 13 and the EPG data that is supplied from the EPG system processor 17 into a transport stream, and transmits it to a satellite (not shown).

Figure 2:
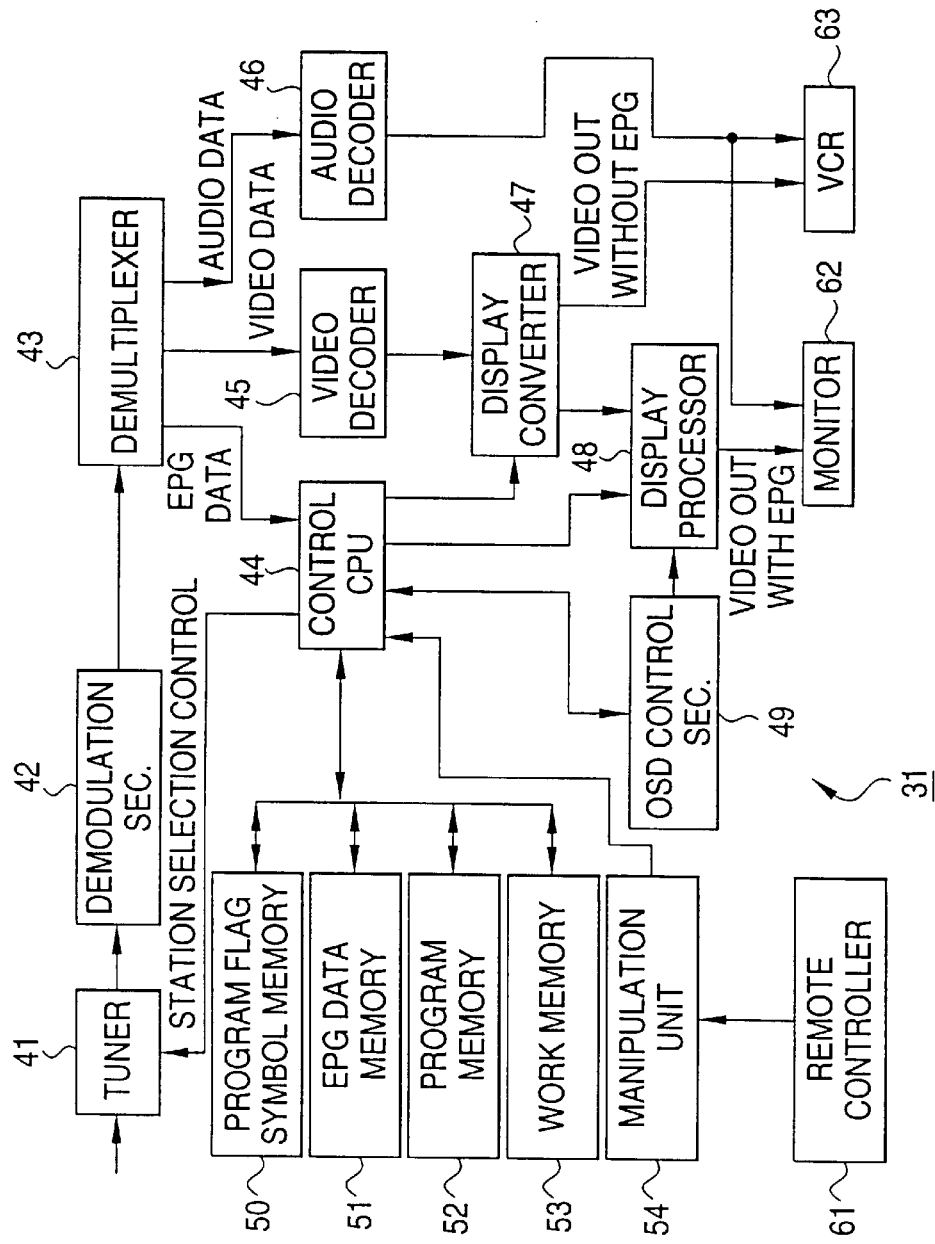
FIG. 2 is a block diagram showing an example configuration of a receiving apparatus according to the invention.

FIG. 2 shows an example configuration of a receiving apparatus 31 for receiving data that is transmitted from the transmitting apparatus 1 of FIG. 1 via a satellite. The receiving apparatus 31 receives, with a tuner 41, radio waves that are transmitted from the satellite and outputs a reception signal to a demodulation section 42. The demodulation section 42 demodulates the signal supplied from the tuner 41 and outputs a demodulation signal to a demultiplexer 43. The demultiplexer 43 extracts not only audio data and video data that constitute program data but also EPG data from the data that is input from the demodulation section 42. The demultiplexer 43 supplies the audio data to an audio decoder 46, the video data to a video decoder 45, and the EPG data to a control CPU 44.

The audio decoder 46 decodes the input audio data and outputs decoded data to, for example, a VCR (video cassette recorder) 63 and a monitor 62 that are connected to the receiving apparatus 31. The video decoder 45 decodes the input video data and outputs decoded data to a display converter 47. The display converter 47 reduces the size of a picture that is based on the video data supplied from the video decoder 45 to a prescribed size in accordance with a control of the control CPU 44, and outputs resulting data to a display processor 48. The display converter 47 also outputs a video data signal that has not been subjected to picture size reduction to the VCR 63.

Controlled by the control CPU 44, an OSD control section 49 generates OSD (on-screen display) data to be superimposed on video data and outputs it to the display processor 48. Controlled by the control CPU 44, the display processor 48 combines the OSD data that is supplied from the OSD control section 49 with the video data that is supplied from the display converter 47, and outputs resulting data to the monitor 62.

A program flag symbol memory 50 stores data of symbols (feature recognition information) to be superimposed on an EPG so that they correspond to respective program flags. An EPG data memory 51 stores the EPG data that has been supplied from the demultiplexer 43 to the control CPU 44. A program memory 52 stores programs that are necessary for the control CPU 44 to execute various processes. A work memory 53 stores, when necessary, data, programs, etc. that are necessary for the control CPU 44 to execute various processes. A manipulation unit 54 captures an infrared signal that is input from a remote controller 61 and an input from buttons, switches, and the like (not shown) that are provided on the main body of the receiving apparatus 31, and outputs a resulting detection signal to the control CPU 44.

Figure 3:
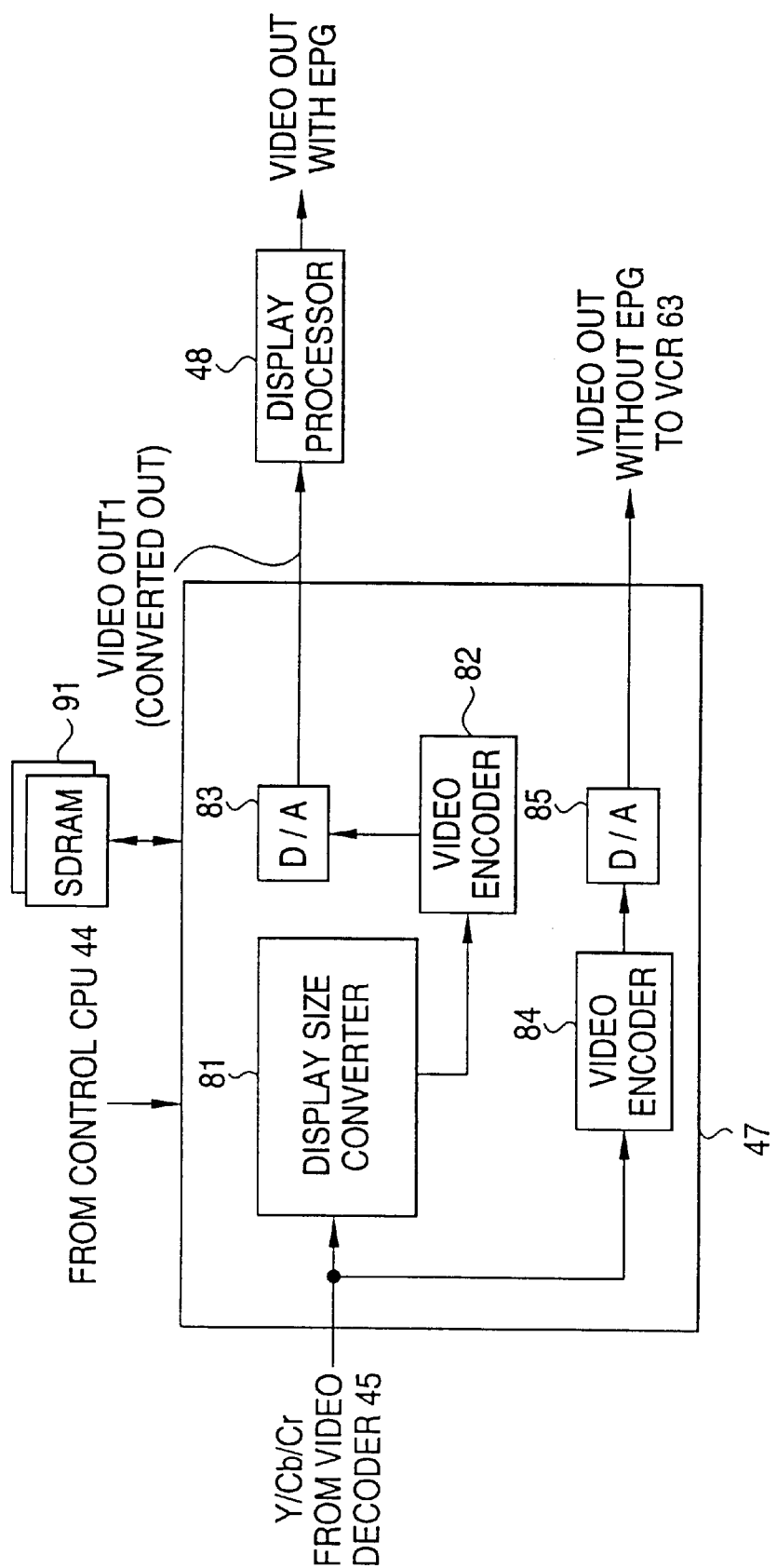
FIG. 3 is a block diagram showing an example configuration of the display converter shown in FIG. 2.

FIG. 3 shows an example configuration of the display converter 47. A display size converter 81 reduces the size of one picture that is formed by a luminance signal Y and color difference signals Cb (B–Y) and Cr (R–Y) that are supplied from the video decoder 45 to a prescribed size in accordance with an instruction that is supplied from the control CPU 44, and outputs resulting data to a video encoder 82. The video encoder 82 converts the video data that is input from the display size converter 81 to video data of, for example, the NTSC (National Television Systems Committee) scheme and outputs it to a D/A converter 83. The D/A converter 83 D/A-converts the input video data and outputs resulting data to the display processor 48. The display processor 48 processes the input video data, combines it with symbols (figures) etc. corresponding to the EPG that are supplied from the OSD control section 49 as described above, and outputs resulting data to the monitor 62.

On the other hand, the video data that is input from the video decoder 45 is converted to video data of the NTSC scheme by a video encoder 84, converted to an analog signal by a D/A converter 85, and then supplied to the VCR 63. The video signal supplied to the VCR 63 does not include the EPG because it is not processed by the display processor 48.

An SDRAM 91 is also connected to the display converter 47. The SDRAM 91 is a memory for temporarily storing picture data when the display size converter 81 changes the display size.

Next, the operations of the above apparatuses will be described. Program data that has been generated by the program generation section 11 is supplied to the encoder 13 via the main system processor 12 and encoded there. On the other hand, the EPG data supply section 18 generates EPG data of broadcast-scheduled programs of two weeks, for example, and outputs the generated EPG data to the editing section 19. The editing section 19 executes an editing process on the EPG data. Where each program has a feature that differentiates it from other programs, the editing section 19 adds, to the EPG data, a program flag that is necessary to superimpose, on the EPG, feature recognition information for allowing viewers to recognize the feature.

Figure 4:
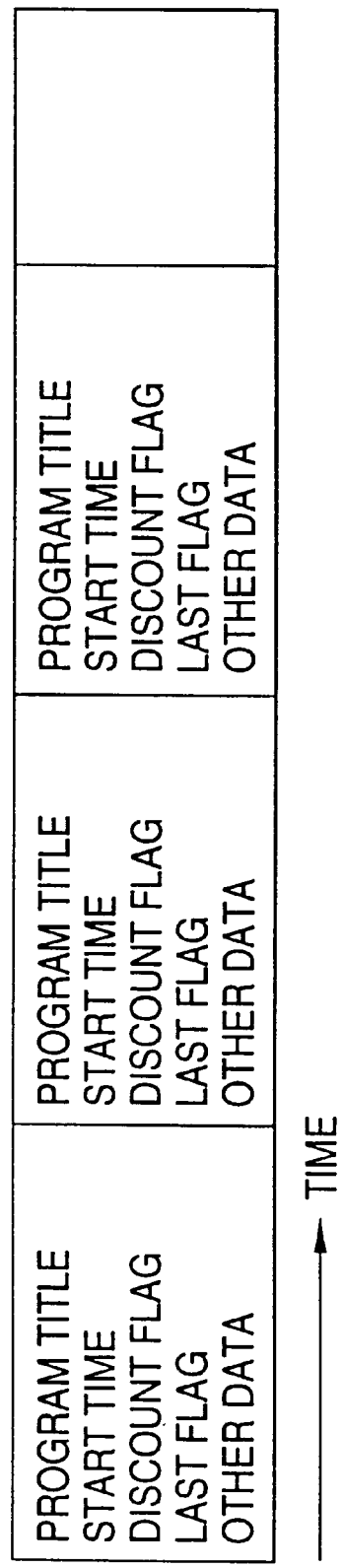
FIG. 4 shows examples of program flags.

FIG. 4 shows examples of program flags. As shown in FIG. 4, when supplied with EPG data including program titles of respective programs from the EPG data supply section 18, broadcast start hours, and other data from the EPG data supply section 18, the editing section 19 adds, to the EPG data, a discount flag for displaying feature recognition information (i.e., a mark "Discount" described later) indicating that the charge of the program is set lower than the other programs so that the feature recognition information is superimposed on the EPG, a last flag for displaying feature recognition information (i.e., a mark "Last" described later) indicating that the program is the last one of NVOD programs so that the feature recognition information is superimposed on the EPG, and other flags.

The format of FIG. 4 is prescribed by DVB (digital video broadcasting)_SI.

The EPG system processor 17 processes the EPG data that is supplied from the editing section 19 so that it will comply with a predetermined format and outputs processed data to the multiplexer 14.

The multiplexer 14 packetizes each of the program data that is supplied from the encoder 13 and the EPG data that is supplied from the EPG system processor 17, combines packetized data into a transport stream, and transmits it to a satellite.

In addition to the discount flag and the last flag, as shown in FIG. 5, the editing section 19 may add an exceptional program flag indicating that the program is an exceptional one, an exclusion flag indicating that the program is an excluded one, a live flag indicating that the program is live, a final program flag indicating that the program is the final one of series programs, and other flags.

In the receiving apparatus 31, the control CPU 44 controls the tuner 41 in accordance with an instruction supplied from the remote controller 61 or the manipulation unit 54, to have it receive a signal coming from a prescribed transponder of the satellite. The demodulation section 42 demodulates a signal that is output from the tuner 41 and outputs a demodulation signal to the demultiplexer 43. The demultiplexer 43 extracts audio data, video data, and EPG data from the data that is supplied from the demodulation section 42, and outputs those data to the audio decoder 46, the video decoder 45, and the control CPU 44, respectively.

The audio decoder 46 decodes the received audio data packets and outputs decoded data to the VCR 63 and the monitor 62. The video decoder 45 decodes the received video data packets and outputs decoded data to the display converter 47.

The display size converter 81 of the display converter 47 stores the received video data in the SDRAM 91 and executes a process of changing its display size to a size corresponding to an instruction that is supplied from the control CPU 44. Video data whose size has been converted to the prescribed size is converted to video data of the NTSC scheme by the video encoder 82, D/A-converted by the D/A converter 83, and then input to the display processor 48.

The video encoder 84 of the display converter 47 encodes the video data that has been supplied from the video encoder 45 into video data of the NTSC scheme without changing its display size, and outputs it to the D/A converter 85. The D/A converter 85 D/A converts the received video data and outputs converted video data to the VCR 63.

The control CPU 44 stores the EPG data that is supplied from the demultiplexer 43 in the EPG data memory 51.

When receiving a prescribed instruction from the remote controller 61 or the manipulation unit 54, the control CPU 44 reads out the EPG data that is stored in the EPG data memory 51 and outputs the read-out data to the OSD control section 49. The OSD control section 49 converts the received EPG data to picture data and outputs it to the display processor 48. The display processor 48 outputs the picture data that is supplied from the OSD control section 49 to the monitor 62 singly or after superimposing it on the video picture data that is supplied from the display converter 47. In this manner, an EPG picture is displayed on the monitor 62.

In displaying the EPG on the monitor 62, the control CPU 44 judges whether the EPG data includes a program flag. If a program flag is included, the control CPU 44 reads out the corresponding symbol data from the program flag symbol memory 50 and outputs it to the OSD control section 49. The OSD control section 49 generates picture data of the symbol, superimposes it on the EPG picture data, and outputs resulting picture data to the monitor 62 via the display processor 48 to display it.

As a result, an EPG shown in FIG. 6, for example, is displayed on the monitor 62. In this example, the display shows that program A is NVOD-broadcast on channels 107–110. A symbol "Live" indicates that, in particular, the program A that will be broadcast from 8 hours on channel 107 is a live program.

Program B is NVOD-broadcast four times on channels 111–114. A symbol "Discount" that is given to the specific program B that will be broadcast second last on channel 113 indicates that charge of this program is set lower than the other versions of program B. Further, the specific program B to be broadcast on channel 114 is given a symbol "Last" indicating that this is the last one of the NVOD programs.

As shown in the display example of FIG. 6, program C is NVOD-broadcast repeatedly on channel 115. The last two versions of program C is given a symbol "Discount" indicating that they are less expensive than the first two versions.

Next, a process that is executed by the control CPU 44 in displaying an EPG as shown in FIG. 6 on the monitor 62 will be described with reference to a flowchart of FIG. 7 (alternatively, it is possible to have the OSD control section 49 execute this process). First, at step S1, the control CPU 44 renders an EPG frame as shown in FIG. 6 on a VRAM (not shown) of the OSD control section 49. Then, the process goes to step S2, where the control CPU 44 reads out program information to be displayed from the EPG data memory 51. At step S3, the control CPU 44 renders the title of the program that has been read out at step S2 on the built-in VRAM of the OSD control section 49 at a position corresponding to its broadcast hour.

Then, at step S4, the control CPU 44 judges whether a program flag exists in the information that has been read out at step S2. If a program flag exists, the process goes to step S5, where the control CPU 44 reads out the symbol data corresponding to the program flag from the program flag symbol memory 50. At step S6, the control CPU 44 causes the symbol data to be combined with the title that has already been rendered at step S3. As a result, the EPG portion corresponding to channel 107 shown in FIG. 6, for example, is rendered on the VRAM.

If it is judged at step S4 that no program flag exists, steps S5 and S6 are skipped.

Then, at step S7, it is judged whether titles have been rendered in all the display areas of the frame. If there remains a display area where no title has been rendered yet, the process returns to step S2 to repeatedly execute step S2 and the subsequent steps. In this manner, the EPG portions corresponding to channels 108–115 shown in FIG. 6 are rendered sequentially. If it is judged at step S7 that titles have been rendered in all the display areas of the frame, the process goes to step S8, where the control CPU 44 controls the OSD control section 49 to read out the picture data that has been rendered on the VRAM, and output it to the monitor 62 via the display processor 48 and display it thereon. As a result, the EPG as shown in FIG. 6 is displayed on the monitor 62.

Figure 8:
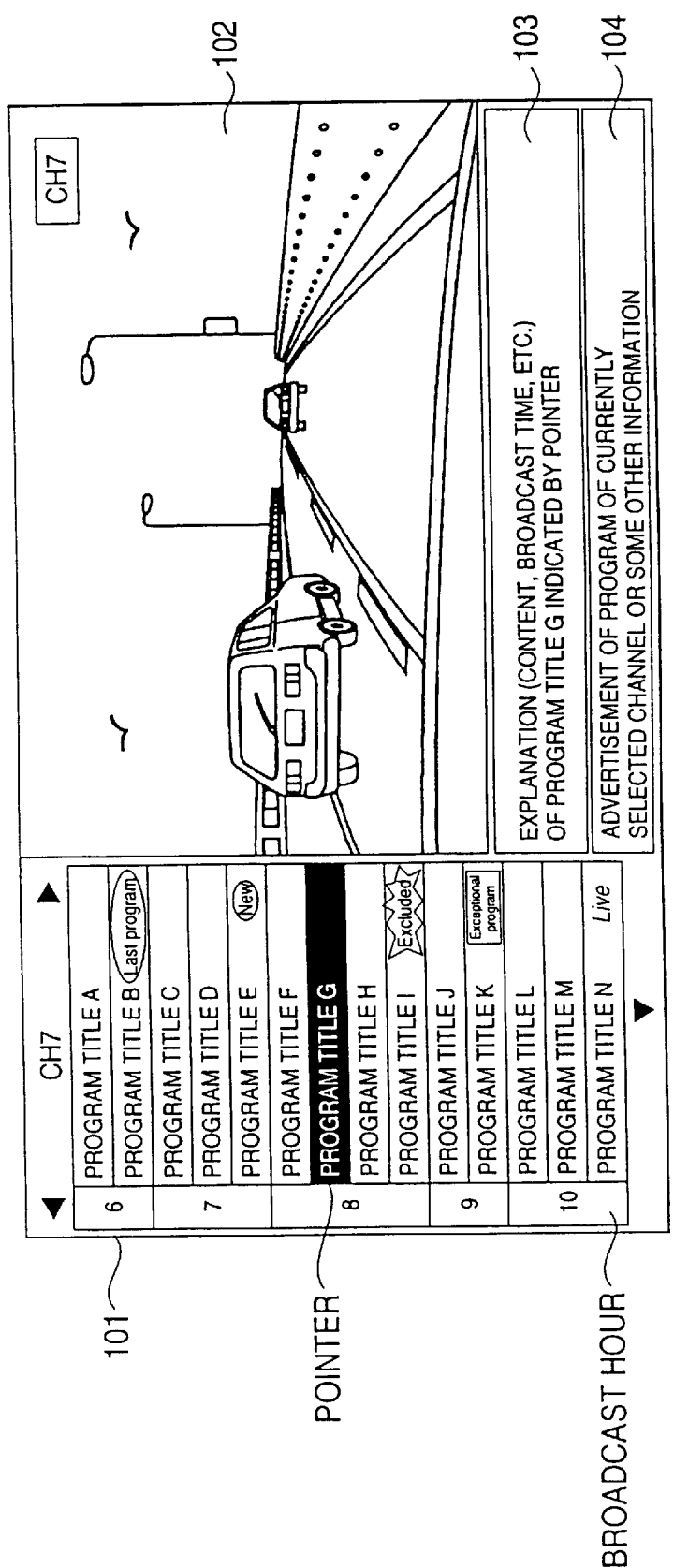
FIG. 8 is an illustration showing another display example on the monitor shown in FIG. 2.

FIG. 8 shows another EPG display example. In this example, an EPG 101 that is long in the vertical direction is displayed in a left-side area of the screen and a reduced picture 102 is displayed in a top-right area. The picture size reduction process is executed by the above-described display size converter 81 of the display converter 47.

An explanation of the program in the EPG 101 that is indicated by a pointer (indicated in black in FIG. 8) is displayed in a display area 103 that is under the program picture 102. Further, promotion information or the like of the program of the picture 102 being displayed is displayed in a display area 104 under the display area 103.

In the EPG 101 of FIG. 8, there are displayed a symbol "Final program" indicating that program B is the final one of series programs, a symbol "New" indicating that program E is a new program, a symbol "Excluded" indicating that program I is an excluded program, a symbol "Special feature" indicating that program K is a special feature program, and a symbol "Live" indicating that program N is live.

FIG. 9 shows a further display example. In this display example, some program titles themselves are displayed in different font, background color, or text color from the other program titles to indicate that they are characteristic programs. In the example of FIG. 9, it is shown that program A (displayed in italic) that will be broadcast from 8 hours on channel 107, program B (displayed in italic) that will be broadcast from 9 hours on channel 114, and the last two programs (displayed in a different color) of the four versions of program C that will be broadcast on channel 115 have different features than the other programs.

The fact that a certain program has a different feature than other programs can be indicated by other methods such as underlining and blinking.

Figure 10:
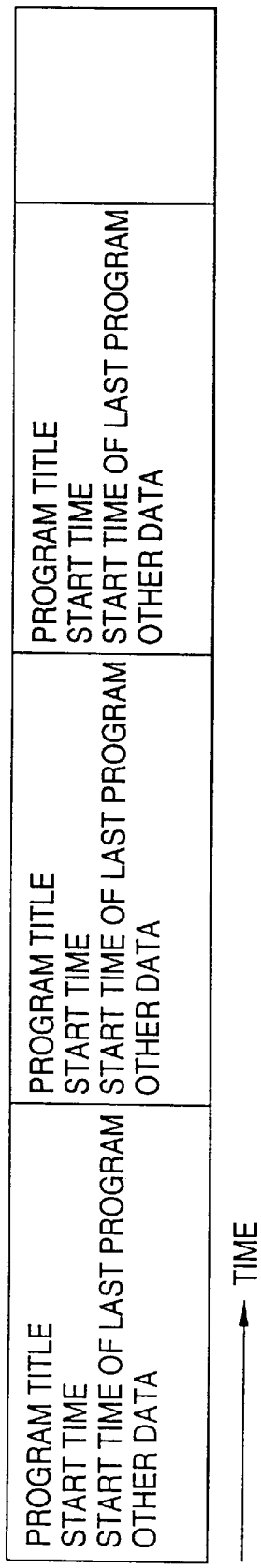
FIG. 10 shows an example of additional information.

Although a program flag is transmitted in the above embodiment, to display the symbol "Last" of NVOD, for example, on an EPG the broadcast start time of the last one of NVOD programs may be broadcast from the transmission side as shown in FIG. 10. In this case, the control CPU 44 of the receiving apparatus 31 executes a process shown in a flowchart of FIG. 11.

Figure 7:
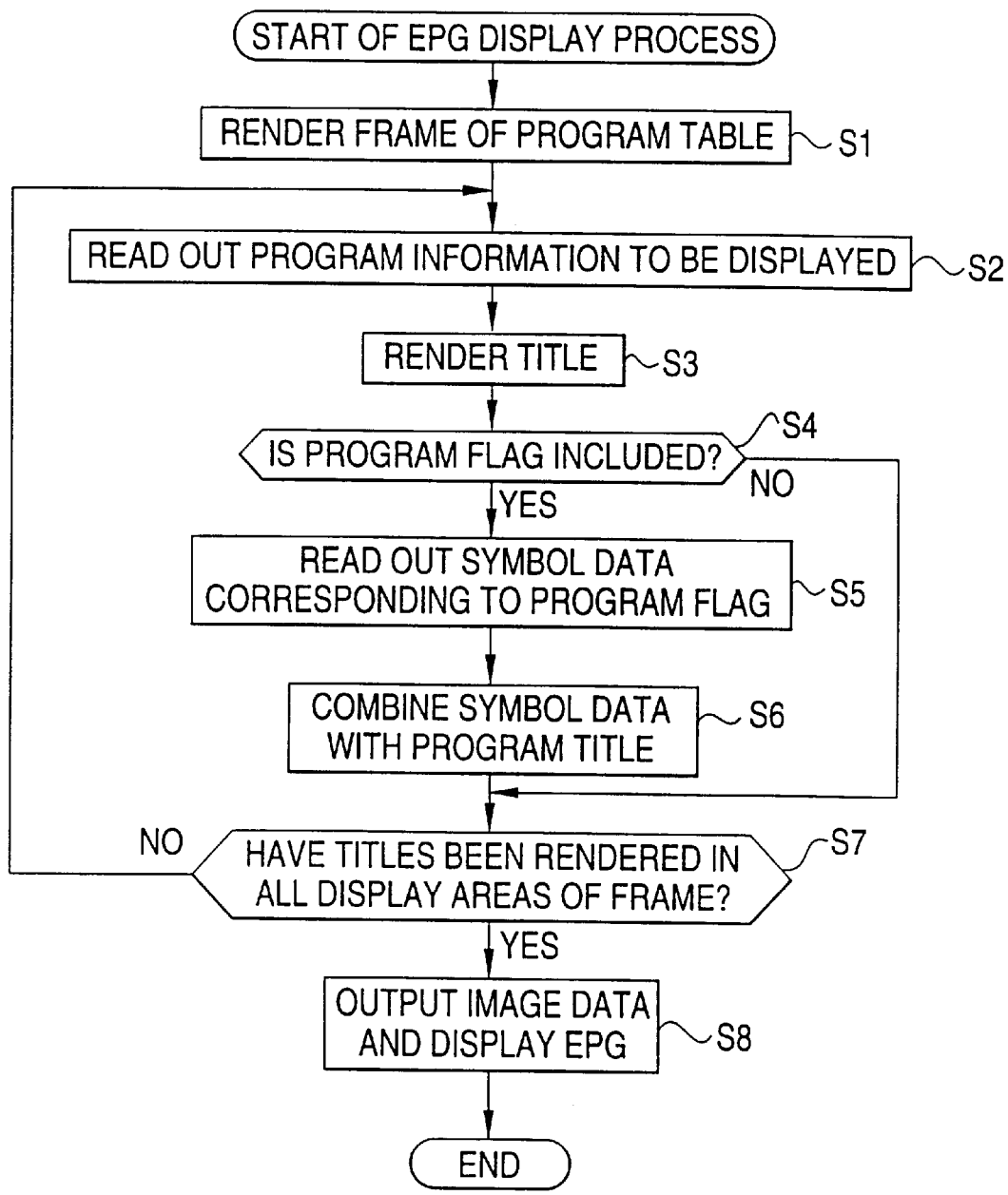
FIG. 7 is a flowchart showing an EPG display process.

Steps S21–S23 are the same as steps S1–S3 in FIG. 7. That is, the frame of a program table is rendered, the information of one program to be displayed is read out, and its title is rendered on the VRAM.

Then, at step S24, the control CPU 44 judges based on the information that has been read out at step S22 whether that information is of an NVOD program. If it is of an NVOD program, the process goes to step S25, where the control CPU 44 judges whether the broadcast start time of the program to be displayed at the present time coincides with that of the last one of the NVOD programs. If they coincides with each other, the process goes to step S26, where the control CPU 44 reads out the symbol data of the last program that is stored in the program flag symbol memory 50. At step S27, the control CPU 44 causes the symbol data to be combined with the title that has already been rendered at step S23.

If it is judged at step S24 that the program to be displayed at the present time is not a NVOD program or if it is judged at step S25 the broadcast start time of that program does not coincide with that of the last one of the NVOD programs, steps S26 and S27 are skipped.

Then, at step S28, it is judged whether titles have been rendered in all the display areas of the frame. If there remains a display area where no title has been rendered yet, the process returns to step S22 to repeatedly execute step S22 and the subsequent steps. If it is judged at step S28 that titles have been rendered in all the display areas of the frame, the process goes to step S29, where the EPG rendered on the VRAM is read out and displayed on the monitor 62.

Although the above embodiments are directed to the case where a signal is transmitted from the transmitting apparatus to the receiving apparatus via a satellite, the invention can also be applied to cases where a signal is transmitted by ground waves or via a cable of CATV or the like.

In the invention, the term "system" means the entire apparatus that is constituted of a plurality of apparatuses, means, etc.

In this specification, the provider that provides users with a computer program for execution of the above process includes not only recording media such as a magnetic disk, a CD-ROM, and a solid-state memory but also communication media such as a network and a satellite.

As described above, in the EPG transmitting apparatus, the EPG transmitting method, and the provider according to the first aspect of the invention, additional information to be used for displaying feature recognition information so that it is superimposed on an EPG is transmitted. Therefore, the transmission side makes it possible to impress viewers with the feature of a desired program quickly and reliably, to thereby promote reception of the program.

In the EPG receiving apparatus, the EPG receiving method, and the provider according to the second aspect of the invention, the stored feature recognition information corresponding to received and extracted additional information is displayed. Therefore, an apparatus can be realized which can reliably promote, on the reception side, viewing of a particular program.

In the EPG transmitting and receiving system, the EPG transmitting and receiving method, and the provider according to the third aspect of the invention, additional information is transmitted from an EPG transmitting apparatus and received by an EPG receiving apparatus and stored feature recognition information is displayed in the EPG receiving apparatus. Therefore, a system can be realized which promotes viewing of programs on a program-by-program basis.

In the EPG receiving apparatus, the EPG receiving method, and the provider according to the fourth aspect of the invention, whether a particular program has a feature that differentiates it from other programs is detected and feature recognition information is displayed so as to be superimposed on an EPG in accordance with a detection result. This makes enables viewers to select quickly and reliably a desired program from programs of the same kind.

What is claimed is:

1. An electronic program guide transmitting apparatus comprising:

generating means for generating an electronic program guide that represents a transmission schedule of programs to be transmitted;

adding means for generating additional information to be superimposed on the electronic program guide, including feature recognition information for allowing a viewer to recognize a feature of a particular program that differentiates the particular program from other programs and for adding the feature recognition information to the electronic program guide; and transmitting means for transmitting the electronic program guide to which the additional information has been added, wherein the particular program is one of a plurality of near video on demand programs, and wherein the feature recognition information is information indicating that the particular program is a last one of the plurality of near video on demand programs.

2. The electronic program guide transmitting apparatus according to claim 1, wherein the particular program is one of a plurality of near video on demand programs, and wherein the feature recognition information is information indicating that a cost to the viewer of the particular program is different from a cost of the other plurality of near video on demand programs.

3. An electronic program guide transmitting method comprising:

a generating step of generating an electronic program guide that represents a transmission schedule of programs to be transmitted;

an adding step of generating additional information to be superimposed on the electronic program guide, including feature recognition information for allowing a viewer to recognize a feature of a particular program that differentiates the particular program from other programs and for adding the feature recognition information to the electronic program guide, wherein the adding step includes adding information to show whether the particular program is a last one of a plurality of near video on demand programs; and a transmitting step of transmitting the electronic program guide to which the additional information has been added.

4. A provider which provides a computer program comprising:

a generating step of generating an electronic program guide that represents a transmission schedule of programs to be transmitted;

an adding step of generating additional information to be superimposed on the electronic program guide, including feature recognition information for allowing a viewer to recognize a feature of a particular program that differentiates the particular program from other programs and for adding the feature recognition information to the electronic program guide, wherein the adding step includes adding information to show whether the particular program is a last one of a plurality of near video on demand programs; and a transmitting step of transmitting the electronic program guide to which the additional information has been added.

5. An electronic program guide receiving apparatus comprising:

receiving means for receiving an electronic program guide to which additional information to be superimposed on the electronic program guide, including feature recognition information for allowing a viewer to recognize a feature of a particular program that differentiates the particular program from other programs, is added, wherein the additional information includes information as to whether the particular program is a last one of a plurality of near video on demand programs;

extracting means for extracting the additional information from the electronic program guide that has been received by the receiving means;

storing means for storing information to be used for displaying the feature recognition information; and display control means for reading out the information stored in the storing means and corresponding to the additional information that has been extracted by the extracting means and for displaying the feature recognition information, including displaying the information to show whether the particular program is the last one of the plurality of near video on demand programs.

6. An electronic program guide receiving method comprising:

a receiving step of receiving an electronic program guide to which additional information to be superimposed on the electronic program guide, including feature recognition information for allowing a viewer to recognize a feature of a particular program that differentiates the particular program from other programs, is added, wherein the additional information includes information as to whether the particular program is a last one of a plurality of near video on demand programs;

an extracting step of extracting the additional information from the electronic program guide that has been received by the receiving step;

a storing step of storing information to be used for displaying the feature recognition information; and a display control step of reading out the information stored by the storing step and corresponding to the additional information that has been extracted by the extracting step and for displaying the feature recognition information, including displaying the information to show whether the particular program is the last one of the plurality of near video on demand programs.

7. A provider which provides a computer program comprising:

a receiving step of receiving an electronic program guide to which additional information to be superimposed on the electronic program guide, including feature recognition information for allowing a viewer to recognize a feature of a particular program that differentiates the particular program from other programs, is added, wherein the additional information includes information as to whether the particular program is a last one of a plurality of near video demand programs;

an extracting step of extracting the additional information from the electronic program guide that has been received by the receiving step;

a storing step of storing information to be used for displaying the feature recognition information; and a display control step of reading out the information stored by the storing step and corresponding to the additional information that has been extracted by the extracting step and for displaying the feature recognition information, including displaying the information to show whether the particular program is the last one of the plurality of near video on demand programs.

8. An electronic program guide transmitting and receiving system comprising:

an electronic program guide transmitting apparatus for transmitting information, including:

generating means for generating an electronic program guide that represents a transmission schedule of programs to be transmitted;

adding means for generating additional information to be superimposed on the electronic program guide, including feature recognition information for allowing a viewer to recognize a feature of a particular program that differentiates the particular program from other programs, and for adding the feature recognition information to the electronic program guide, wherein the particular program is one of a plurality of near video on demand programs and the feature recognition information indicates whether the particular program is a last one of the plurality of near video on demand programs; and transmitting means for transmitting the electronic program guide to which the additional information has been added; and an electronic program guide receiving apparatus for receiving the information transmitted from the electronic program guide transmitting apparatus, including:

receiving means for receiving the electronic program guide transmitted from the electronic program guide transmitting apparatus;

extracting means for extracting the additional information from the electronic program guide received by the receiving means;

storing means for storing information to be used for displaying the feature recognition information; and display control means for reading out the information stored in the storing means and corresponding to the additional information that has been extracted by the extracting means and for displaying the feature recognition information, including displaying the information to show whether the particular program is the last one of the plurality of near video on demand programs.

9. An electronic program guide transmitting and receiving method for an electronic program guide transmitting and receiving system including an electronic program guide transmitting apparatus for transmitting information and an electronic program guide receiving apparatus for receiving the information transmitted from the electronic program guide transmitting apparatus, the method comprising in the electronic program guide transmitting apparatus:

a generating step of generating an electronic program guide that represents a transmission schedule of programs to be transmitted;

an adding step of generating additional information to be superimposed on the electronic program guide, including feature recognition information for allowing a viewer to recognize a feature of a particular program that differentiates the particular program from other programs, and for adding the feature recognition information to the electronic program guide, wherein the adding step includes adding information to show whether the particular program is a last one of a plurality of near video on demand programs; and a transmitting step of transmitting the electronic program guide to which the additional information has been added, the method further comprising in the electronic program guide receiving apparatus:

a receiving step of receiving the electronic program guide transmitted by the transmitting step;

an extracting step of extracting the additional information from the electronic program guide received by the receiving step;

a storing step of storing information to be used for displaying the feature recognition information; and a display control step of reading out the information stored by the storing step and corresponding to the additional information that has been extracted by the extracting step and for displaying the feature recognition information, including displaying the information to show whether the particular program is the last one of the plurality of near video on demand programs.

10. A provider for providing a computer program to be used in an electronic program guide transmitting and receiving system including an electronic program guide transmitting apparatus for transmitting information and an electronic program guide receiving apparatus for receiving the information transmitted from the electronic program guide transmitting apparatus, the computer program for the electronic program guide transmitting apparatus comprising:

a generating step of generating an electronic program guide that represents a transmission schedule of programs to be transmitted;

an adding step of generating additional information to be superimposed on the electronic program guide, including feature recognition information for allowing a viewer to recognize a feature of a particular program that differentiates the particular program from other programs, and for adding the feature recognition information to the electronic program guide, wherein the adding step includes adding information to show whether the particular program is a last one of a plurality of near video on demand programs; and a transmitting step of transmitting the electronic program guide to which the additional information has been added, the computer program for the electronic program guide receiving apparatus comprising:

a receiving step of receiving the electronic program guide transmitted by the transmitting step;

an extracting step of extracting the additional information from the electronic program guide received by the receiving step;

a storing step of storing information to be used for displaying the feature recognition information; and a display control step of reading out the information stored by the storing step and corresponding to the additional information that has been extracted by the extracting step and for displaying the feature recognition information, including displaying the information to show whether the particular program is the last one of the plurality of near video on demand programs.

11. An electronic program guide receiving apparatus comprising:

receiving means for receiving an electronic program guide that represents a schedule of programs to be transmitted;

detecting means for detecting whether a particular program has a feature that differentiates the particular program from other programs; and display control means for displaying, in accordance with a recognition result of the detecting means, feature recognition information for allowing a viewer to recognize that the particular program has the feature that differentiates the particular program from the other programs, so that the feature recognition information is superimposed on the electronic program guide, wherein the detecting means detects whether the particular program is a last one of near video on demand programs, and wherein the display control means displays the feature recognition information for allowing a viewer to recognize that the particular program is the last one of the near video on demand programs if the detecting means has detected that the particular program is the last one of the near video on demand programs.

12. The electronic program guide receiving apparatus according to claim 12, wherein the detecting means detects whether the particular program is the last one of the near video on demand programs based on a flag that is transmitted together with the electronic program guide.

13. The electronic program guide receiving apparatus according to claim 11, wherein the detecting means detects whether the particular program is the last one of the near video on demand programs based on time information that is included in the electronic program guide.

14. The electronic program guide receiving apparatus according to claim 11, wherein the detecting means detects whether a cost to the viewer of the particular program is different from a cost to the viewer of the other near video on demand programs, and wherein the display control means displays the feature recognition information for allowing a viewer to recognize whether the cost to the viewer of the particular program is different from that of the other of the near video on demand programs if the detecting means has detected that the cost to viewer of the particular program is different from the cost to the viewer of the other of the near video on demand programs.

15. The electronic program guide receiving apparatus according to claim 14, wherein the detecting means detects whether the cost to the viewer of the particular program is different from the cost to the viewer of the other of the near video on demand programs based on a flag that is transmitted together with the electronic program guide.

16. The electronic program guide receiving apparatus according to claim 11, further comprising storing means for storing the feature recognition information.

17. The electronic program guide receiving apparatus according to claim 16, wherein the feature recognition information is a symbol.

18. An electronic program guide receiving method comprising:

a receiving step of receiving an electronic program guide that represents a schedule of programs to be transmitted;

a detecting step of detecting whether a particular program has a feature that differentiates the particular program from other programs, including detecting information relating to whether the particular program is a last one of a plurality of near video on demand programs; and a display control step of displaying, in accordance with a recognition result of the detecting step, feature recognition information for allowing a viewer to recognize that the particular program has the feature that differentiates the particular program from the other programs, so that the feature recognition information is superimposed on the electronic program guide, including displaying the information to show whether the particular program is the last one of the plurality of near video on demand programs.

19. A provider for providing a computer program comprising:

a receiving step of receiving an electronic program guide that represents a schedule of programs to be transmitted;

a detecting step of detecting whether a particular program has a feature that differentiates the particular program from other programs, including detecting information relating to whether the particular program is a last one of a plurality of near video on demand programs; and a display control step of displaying, in accordance with a recognition result of the detecting step, feature recognition information for allowing a viewer to recognize that the particular program has the feature that differentiates the particular program from the other programs, so that the feature recognition information is superimposed on the electronic program guide, including displaying the information to show whether the particular program is the last one of the plurality of near video on demand programs.

* * * * *